H. D. WEED.
GRIP TREAD FOR VEHICLE TIRES.
APPLICATION FILED JUNE 10, 1914.
1,181,277.
Patented May 2, 1916.
2 SHEETS—SHEET 1.
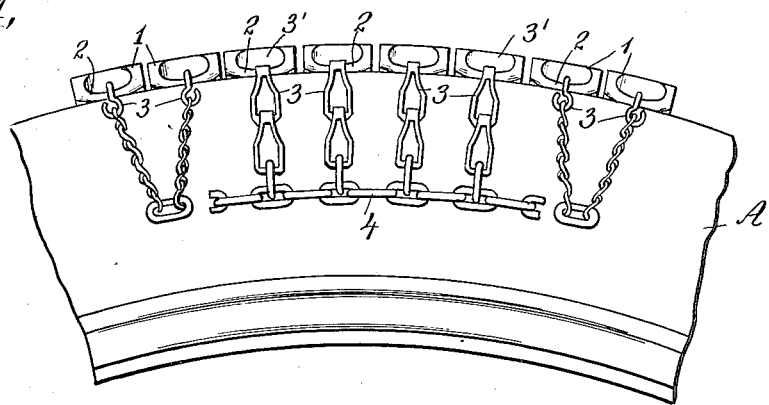
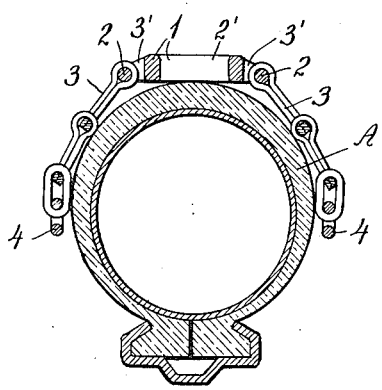
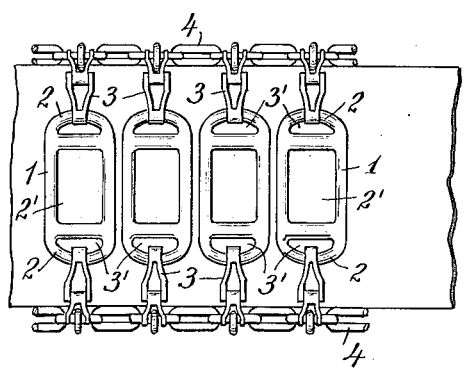
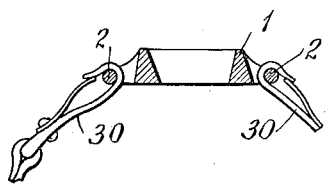
WITNESSES
Jessie B. Kay
Charles Eberhart
INVENTOR
Harry D. Weed
BY
Harry L. Duncan ATTORNEY

H. D. WEED.
GRIP TREAD FOR VEHICLE TIRES.
APPLICATION FILED JUNE 10, 1914.

1,181,277.

Patented May 2, 1916.
2 SHEETS—SHEET 2.

WITNESSES
Jessie B. Kay
Charles Eberhart

INVENTOR
Harry D. Weed
BY
Harry L. Duncan ATTORNEY

UNITED STATES PATENT OFFICE.

HARRY D. WEED, OF SYRACUSE, NEW YORK, ASSIGNOR, BY MESNE ASSIGNMENTS, TO AMERICAN CHAIN COMPANY, INC., OF BRIDGEPORT, CONNECTICUT, A CORPORATION OF NEW YORK.

GRIP-TREAD FOR VEHICLE-TIRES.

1,181,277. Specification of Letters Patent. Patented May 2, 1916.

Original application filed March 13, 1906, Serial No. 305,754. Divided and this application filed June 10, 1914. Serial No. 844,145.

*To all whom it may concern:*

Be it known that I, HARRY D. WEED, formerly a resident of Canastota, and now a resident of Syracuse, in the county of Onondaga and State of New York, have made a certain new and useful Invention Relating to Grip-Treads for Vehicle-Tires, of which the following, taken in connection with the accompanying drawings, is a full, clear, and exact description.

This application is based upon and is a division of my co-pending application, Serial No. 305,754, filed March 13, 1906.

This invention relates to certain improvements in grip treads for vehicle tires and is particularly useful as an attachment to the rubber tires of traction wheels of automobiles or self propelling vehicles.

The essential purpose of my present invention is to loosely apply a circumferential series of wearing plates or elements to the periphery or tread of the tire and to secure them in place by attaching elements located wholly within the tread or wearing surface of the wearing plates so as to avoid direct wear upon the attaching elements and enable the user or manufacturer to remove the impaired tread elements and replace them by new ones.

Heretofore the gripping elements on the tread of the tire have been incorporated with the attaching elements in such manner as to bear fully as much friction with the pavement as the wearing plates which necessitated the replacing of the entire circumferential tread, including the attaching elements, and the primary object of my present invention is to confine the wear to the tread plates and to enable them to be removed and replaced by new ones when impaired.

Another object is to anchor the tread plates in such manner that each has a free and independent action irrespective of the others and of the tire to which they are applied.

Other objects and uses will appear in the following description.

Figure 5:
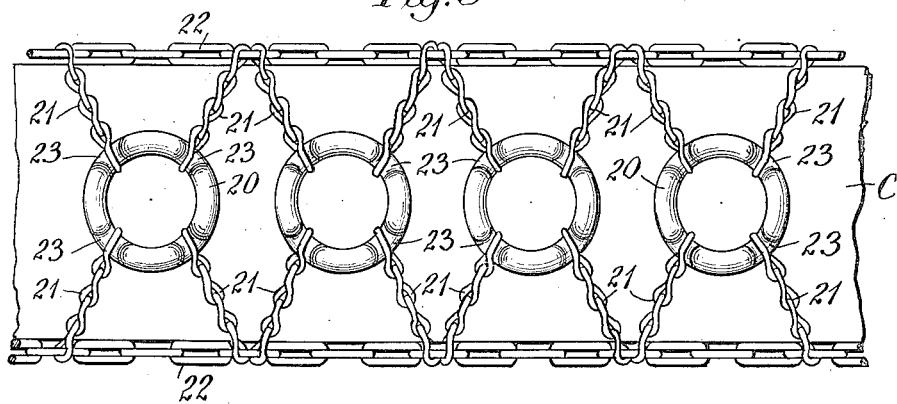
Figure 7:
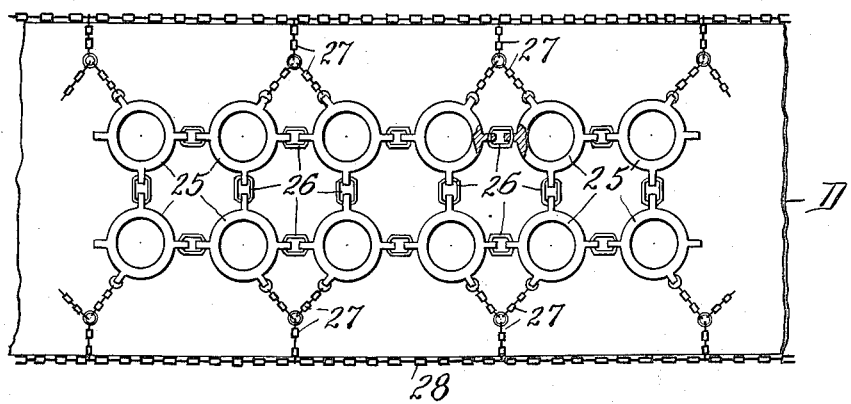
Figure 6:
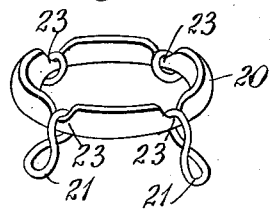
Figure 8:
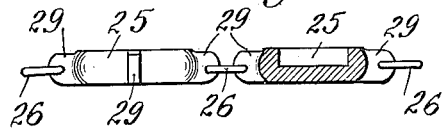

In the drawings Figure 1 is a side elevation of a portion of a pneumatic vehicle tire and a series of one form of tread plates and their attaching elements whereby they are held upon the periphery of the tire. Figs. 2 and 3 are respectively a transverse sectional view and a top plan view of the parts shown in Fig. 1. Fig. 4 is a sectional view of a similar wearing plate showing attaching elements detachably connected thereto. Fig. 5 is a top plan view of a portion of a vehicle tire and a modified form of the gripping elements and attaching means therefor. Fig. 6 is a detail view showing one of these gripping elements or wearing plates. Fig. 7 is a top plan view of another modified form of grip. Fig. 8 is a side view of a pair of such adjacent gripping elements showing the means of attaching one of them to the other.

The grip tread or armor hereinbefore referred to comprises the entire circular series of wearing plates and their attaching elements and will be considered as being continuous or co-extensive with the tread of the tire. But in order to avoid unnecessary drawing and also for the purpose of more clearly defining the invention I have shown only portions of a tire and corresponding portions of the grip tread.

In Figs 1, 2 and 3, this grip tread preferably consists of a circular series of separate wearing elements 1 arranged side by side circumferentially around the tire and having substantially flat inner faces resting upon the tread of the tire and tangentially to the transverse curvature of said tread, as best seen in Fig. 2.

The sides or transverse ends of each wearing element 1 preferably extend some distance beyond the point of contact with the tread of the tire and are formed with suitable bearings 2 which are depressed some distance within the plane of the wearing surface for receiving suitable attaching elements, as in this instance flat links 3, which are connected to opposite circular side pieces 4, one at each side of the tire for holding the wearing elements centrally upon the periphery of the tire.

The attaching elements 3 are wholly within the plane of outer faces or wearing surfaces of the tread elements 1 and are flexibly connected to the bearings 2 and side pieces 4 to enable the tread elements 1 to conform to the depression of the tread of the tire caused by the superimposed load or obstructions which the wheel may encounter while traveling along the pavement.

By making the inner faces of the wearing elements 1 flat and tangential to the transverse curvature of the tire said wearing elements have a free transverse rocking or flexing action with their attaching elements and the points of contact with the tire being comparatively small and the entire grip tread being free to move transversely and circumferentially upon the tire, it is obvious that the frictional wear is distributed around the entire periphery of the tire and is not confined to any particular point or points, as would be the case if the plates were secured to the tire or rim of the wheel.

The particular features of the advantage of my improved grip tread are, first, that the attaching points of the attaching elements are removed some distance within the wearing surfaces of the tread elements; second, that the contacting surfaces between said elements and periphery of the tire is reduced to a minimum; third, that these elements have a free transverse rocking or flexing action on the periphery of the tire; and fourth, that the entire grip tread as an unitary structure is free to creep or move circumferentially around the tire thereby more evenly distributing the wear so as not to confine it at any particular point or points in the tire.

Each of the wearing elements 1 is shown as provided with a central opening 2' and with opposite side slots 3' through which the links 3 are inserted and attached to the bearings 2. In Fig. 4 I have shown a wearing plate 1 as provided with depressed bearings 2 for receiving detachable attaching devices, such as snap hooks, 30, which may be readily disconnected from the wearing plate 1 to permit the latter to be removed when worn or otherwise impaired.

All of the elements of the grip tread are made of suitable metal adapted to withstand the strain and wear to which they are subjected, the wearing elements 1 being preferably made of cast metal, such as malleable iron or equivalent tenacious metal and are adapted to be replaced when impaired by wear or other cause, without sacrificing the attaching elements or side pieces.

In Figs. 5 and 6 I have shown a circular series of gripping elements, as rings 20, arranged one in advance of the other around and upon the periphery of the tire, as C, and each connected by a series of, in this instance four, attaching elements 2; to circular side pieces, as chains 22.

As in the previously described gripping elements the rings 20 are provided with depressed bearings 23 to which the attaching members 21 are flexibly connected so as to lie within the wearing surfaces of the members 20 and thereby avoid direct contact with the pavement, the adjacent attaching elements of the contiguous wearing rings being preferably connected at substantially the same point to the circular side pieces 22.

In Figs. 7 and 8 I have shown a further modified form of tread elements 25 arranged side by side in two circular rows around and upon the periphery of the tire, as D, and attached to each other by means of flexing links 26, those of each row being connected by attaching elements 27 to circular side pieces, as chains 28. For this purpose the wearing plates or elements 25 are provided with radial lugs or ears 29 having apertures within their wearing faces through which the links 26 are passed and are also depressed within the plane of the wearing surface of the plates 25.

Many other modifications of the wearing elements and attaching elements might be disclosed, having the common advantage of connecting the attaching elements to the wearing elements within the wearing surfaces of the latter so as to bring the wear entirely upon the wearing elements and not upon the attaching devices.

What I claim is:

1. A grip for resilient wheel tires comprising longitudinal retaining members, tread members adapted to coöperate with the tire and having projecting wearing portions provided with closed open centered outlines to engage and grip the roadway and to coöperate with the tire, said tread members having integral attaching portions extending outward from said wearing portions and formed with attaching apertures depressed below said roadway engaging wearing portions and attaching chain members connected to said depressed attaching apertures and to said longitudinal retaining members.

2. A grip for resilient wheel tires comprising longitudinal retaining members, tread members adapted to coöperate with the tire and having projecting wearing portions to engage and grip the roadway, said tread members having attaching portions extending outward from said wearing portions and formed with attaching apertures depressed below said roadway engaging wearing portions and attaching members connected to said depressed attaching apertures and to said longitudinal retaining members.

3. A grip for resilient wheel tires comprising longitudinal retaining members, tread members each adapted to coöperate with the tire and having a projecting wearing portion provided with closed open centered outlines to engage and grip the roadway, said tread members each having a plurality of integral attaching portions on opposite sides extending outward from said wearing portions and depressed below said roadway engaging wearing portions so as to lie out of contact with the roadway and attaching chain members normally out of contact with the roadway and connected to said depressed attaching portions and to said longitudinal retaining members.

4. A grip for resilient wheel tires comprising retaining members, tread members each adapted to coöperate with the tire and having a projecting wearing portion to engage and grip the roadway, said tread members each having a plurality of attaching portions on opposite sides extending outward from said wearing portions and depressed below said roadway engaging wearing portions so as to lie out of contact with the roadway and attaching members normally out of contact with the roadway and connected to said depressed attaching portions and to said retaining members.

5. A grip for resilient wheel tires comprising retaining members, tread members each adapted to coöperate with the tire and having a projecting wearing portion to engage the roadway, said tread members each having attaching portions on opposite sides extending outward from said wearing portions and depressed below said roadway engaging wearing portions so as to lie out of contact with the roadway and attaching members connected to said depressed attaching portions and to said retaining members.

6. A chain grip for resilient tires comprising side retaining chains, tread members each having a base to engage the tire and provided with a central outstanding roadway engaging portion presenting closed open centered outlines to the tire and roadway, said tread members being formed with end extensions that lie out of contact with the roadway and provided with anchor openings and flat securing chains normally out of contact with the roadway secured at one end in said anchor openings and having their other ends connected to said side chains.

7. A chain grip for resilient tires comprising side retaining chains, tread members each having a base to engage the tire and provided with a central outstanding roadway engaging portion presenting closed open centered outlines to the roadway, said tread members being formed with end extensions that lie out of contact with the roadway and provided with anchor openings and securing chains normally out of contact with the roadway secured at one end in said anchor openings and having their other ends connected to said side chains.

8. In a tire mat, the combination with side chains, of tread pieces including a base adapted to coöperate with the tire, said base having a central outstanding ring-shaped roadway engaging portion, said base having end extensions that lie out of contact with the roadway, said end extensions each having anchor openings therein adjacent the free ends thereof, and securing chains lying in contact with the sides of the tire and having one of their ends fixed to the anchor openings and their other ends connected with the side chains.

9. In a tire mat, the combination with side retaining members, of tread pieces including a base adapted to engage the tire, said base having a central outstanding roadway engaging portion having a closed open centered outline, said base having end extensions that lie out of contact with the roadway, said end extensions each having anchor openings therein adjacent the free ends thereof, and securing chains lying in contact with the sides of the tire and having one of their ends fixed to the anchor openings and their other ends connected with the retaining members.

10. A grip tread for resilient wheel tires comprising longitudinal retaining members, tread members presenting closed open-centered outlines to the tire, and each having a base adapted to coöperate with the tire and having a projecting wearing portion, said base having depressed end extensions provided with anchor openings and attaching chains engaging said anchor openings and connected to said retaining members.

HARRY D. WEED.

Witnesses:
L. R. La France,
S. J. Kaiser.